J. L. CURRY.
CORN HARROW AND CULTIVATOR.
No. 192,742. Patented July 3, 1877.
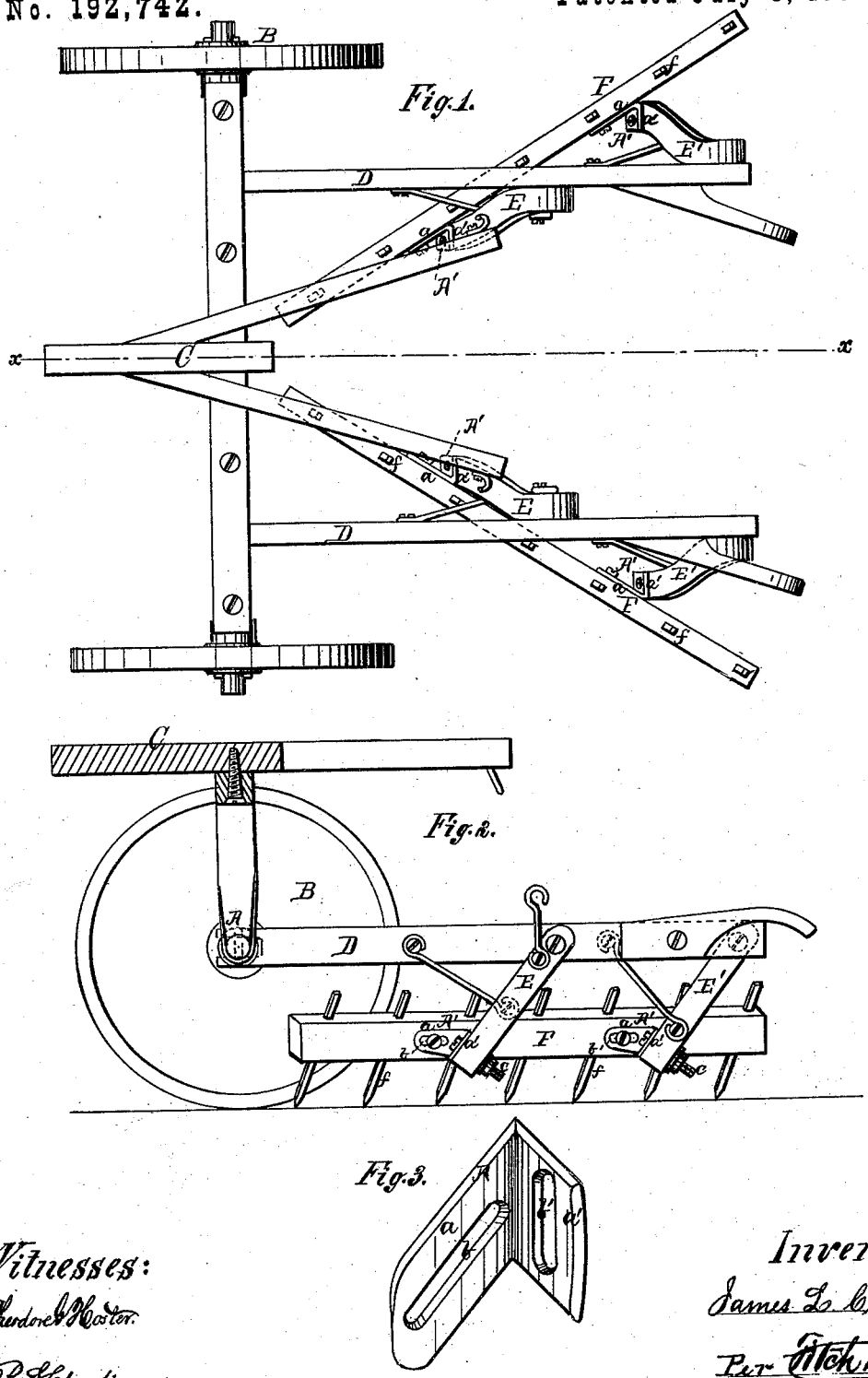
Witnesses:
Inventor:
James L. Curry
Per Atch & Atch
Atty's

UNITED STATES PATENT OFFICE.

JAMES L. CURRY, OF OSKALOOSA, IOWA.

IMPROVEMENT IN CORN HARROWS AND CULTIVATORS.

Specification forming part of Letters Patent No. 192,742, dated July 3, 1877; application filed January 9, 1877.

*To all whom it may concern:*

Be it known that I, JAMES L. CURRY, of Oskaloosa, county of Mahaska, in the State of Iowa, have invented certain Improvements in Corn Harrows and Cultivators, of which the following is a full, clear, and exact description, reference being had to the accompanying drawings, forming part of this specification.

My invention consists in the combination, with the arms of the beam of a wheel cultivator or harrow, of the angle-irons or couplers, hereinafter particularly set forth and described, whereby the harrow may be readily and conveniently taken off and replaced, or a bar carrying cultivator-teeth be put on the beam, or a plowshare secured thereto in place of either, as hereinafter specified.

Figure 1 is a plan of a wheel-harrow which embodies my invention. Fig. 2 is a sectional side elevation of the same on the line $x\ x$, Fig. 1. Fig. 3 is a view, in detail, of the angle-irons or couplers I employ.

My invention relates, principally, to a wheel harrow or cultivator employed in corn-cultivation.

A is the axle of the running-gear. B are the wheels. C is the tongue, raised above the axle, as is usual in this class of implements. D are the beams, pivoted on the axle, as shown. These beams are usually employed in pairs, as shown. From each beam depend the arms E E, to which they are braced, as shown. F is the harrow bar or beam, carrying the teeth $f$, as shown. A' represents my peculiar angle-irons or couplers, which I employ to fasten the harrow to the arms E E.

These couplers are formed of two plates, which meet each other at an acute angle, and are joined at said angle, and they are usually fabricated of one piece of metal, which is turned back upon itself to form the said acute angle between the two ends or wings $a$ and $a'$. The wing $a$ is also inclined downward from the wing $a'$.

The coupler is secured to the beam F, which carries the harrow-teeth, by a screw passing through a slotted opening, $b$, in said wing. This slot $b$ is formed in the direction of the incline of the wing $a$ to the wing $a'$, as shown.

The wing $a'$ is slotted at $b'$, in the line of the direction of the incline of the wing $a'$ to the wing $a$, and the coupler is secured to one of the arms E, depending from the beam D, by a bolt, $c$, passing through the slot $b'$ in the wing $a'$, and through said arm E, as shown.

The outer face of the wing $a$ being in juxtaposition to the side of the beam F, and the outer face of the wing $a'$ being in juxtaposition to the front side of the arm E, and the coupler thus secured, the harrow-beam will, by means of the peculiar form of the coupler, be given the proper inclination to the surface of the soil, as shown, while, by means of the slots $b$ and $b'$ in the wings of the couplers, the harrow is adjustable from front to rear, and vice versa, and up and down on the arms E.

Now, it is evident that the harrow may be readily and conveniently removed from, or replaced upon, the arms E by means of the peculiar couplers A', or that, the harrow being removed, a beam carrying cultivator-teeth may be substituted for the harrow, and secured in proper position upon the arms E by means of said couplers; or that a plow-shovel may be secured upon the said arms E, and thus the same rolling-gear may be used to operate a harrow, a cultivator, or plow, thus obviating the expense of three distinct complete implements.

I do not intend to claim, broadly, an implement capable of conversion at pleasure from a harrow into a cultivator or a gang-plow, or vice versa. I desire to limit my claim hereunder to the exact and specific invention shown and described, which is the combination, in a wheel corn-harrow, with the arms E depending from beam D, of the peculiar angle-irons or couplers A', having the wings $a$ and $a'$ meeting at an acute angle, the wing $a$ being inclined obliquely downward from the wing $a'$, and the wing $a$ having the slot $b$, and the wing $a'$ the slot $b'$, as described, whereby the harrow-beam F is capable of being secured to the arms E, may be adjusted thereon, or may be displaced therefrom and a cultivator-beam substituted in its place, as I have set forth.

What I claim, therefore, as my invention, and desire to secure by Letters Patent, is—

In a wheel corn harrow or cultivator, the combination, with the arms E, depending from the beam D, of the peculiar couplers A, composed of the wings $a\ a'$, meeting at an acute angle, the said wings being obliquely inclined toward each other, and being slotted at $b\ b'$, respectively, in the line of the direction of their inclination, together with the beam F and the bolts $c$, as and for the purpose specified.

JAMES L. CURRY.

Witnesses:
 LEONARD H. HOLE,
 BRINTON GREGORY.